United States Patent
Li

(10) Patent No.: US 7,429,992 B2
(45) Date of Patent: *Sep. 30, 2008

(54) METHOD AND SYSTEM FOR PROVIDING ACCELERATED VIDEO PROCESSING IN A COMMUNICATION DEVICE

(75) Inventor: Joy Li, Newark, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/740,692

(22) Filed: Apr. 26, 2007

(65) Prior Publication Data

US 2007/0188513 A1 Aug. 16, 2007

Related U.S. Application Data

(63) Continuation of application No. 10/874,471, filed on Jun. 22, 2004, now Pat. No. 7,227,554.

(60) Provisional application No. 60/577,370, filed on Jun. 4, 2004.

(51) Int. Cl.
- G09G 5/36 (2006.01)
- G09G 5/02 (2006.01)
- H04N 7/01 (2006.01)
- H04N 11/06 (2006.01)
- H04N 5/46 (2006.01)
- G06K 9/36 (2006.01)
- G06K 9/00 (2006.01)
- H04N 11/20 (2006.01)
- H04N 9/64 (2006.01)

(52) U.S. Cl. .......... 345/603; 345/547; 348/441; 348/488; 348/555; 348/715; 382/166

(58) Field of Classification Search ............ 345/418, 345/603–605, 549, 547, 519; 348/441, 443, 348/454, 488, 502–503, 555, 557, 715, 742; 382/162–167; 386/52, 64; 725/134; 375/240.03, 375/240.01

See application file for complete search history.

(56) References Cited

U.S. PATENT DOCUMENTS

| | | | |
|---|---|---|---|
| 4,885,634 A | 12/1989 | Yabe | |
| 6,727,907 B2 | 4/2004 | Nonomura et al. | |
| 2002/0140852 A1* | 10/2002 | Miller et al. | 348/441 |
| 2003/0043295 A1 | 3/2003 | Reneau et al. | |
| 2004/0136688 A1 | 7/2004 | Searby | |
| 2004/0187165 A1 | 9/2004 | Kai et al. | |
| 2005/0226324 A1 | 10/2005 | Ouyang et al. | |
| 2005/0286444 A1 | 12/2005 | Yang et al. | |

* cited by examiner

*Primary Examiner*—Wesner Sajous
(74) *Attorney, Agent, or Firm*—McAndrews, Held & Malloy, Ltd.

(57) ABSTRACT

Providing accelerated video processing in a communication device may comprise receiving video data from a video source on a chip, determining a first format for at least a portion of the received video data, and determining a second format of at least a remaining portion of the received video data. At least a portion of the received video data having the first format may be routed to a first device for processing and at least a remaining portion of the received video data having the second format may be routed to a second device for processing. The portion of the received video data with the first format may comprise RGB format, while the remaining portion of the received video data with the second format comprises YUV format. The received video data comprises images with alternating video formats, which are accordingly routed to the first or second device for processing.

24 Claims, 3 Drawing Sheets

METHOD AND SYSTEM FOR PROVIDING ACCELERATED VIDEO PROCESSING IN A COMMUNICATION DEVICE

CROSS-REFERENCE TO RELATED APPLICATIONS/INCORPORATION BY REFERENCE

This application is a continuation of U.S. patent application Ser. No. 10/874,471 filed Jun. 22, 2004, which in turn makes reference to, claims priority to and claims the benefit of U.S. Provisional Application Ser. No. 60/577,370 filed on Jun. 4, 2004.

The above referenced application is hereby incorporated herein by reference in its entirety.

FIELD OF THE INVENTION

Certain embodiments of the invention relate to processing of video signals. More specifically, certain embodiments of the invention relate to a method and system for providing accelerated video processing in a communication device.

BACKGROUND OF THE INVENTION

FIG. 1 is a block diagram of a conventional video processing subsystem of a communication device such as such as a mobile telephone, personal digital assistant (PDA) or a hybrid thereof. Referring to FIG. 1, there is shown a camera 102, CPU 104, DISPLAY 106, storage block 108, CODEC 110, and RGB-YUV block 112. The CPU 104, CODEC 110, and RGB-YUV block 112 may be packaged in an integrated circuit (IC) 114 or system-on-chip (SoC), for example.

The red, green and blue (RGB) color space represents the basic component analog signal set where a signal is utilized to represent each of the primary colors. A camera generates the three RGB colors and in a television or monitor, for example, the colors are added together in order to reproduce an image. The addition of the colors are referred to as primary additive color reproduction, and conforms to a three dimensional color coordinate system referred to as a RGB color cube. Although RGB is well known and widely utilized, it suffers from some drawbacks. For example, RGB requires the red, green and blue components to be of equal bandwidth in order to generate the colors within the RGB cube. As a result, frame buffers require the same depth and display resolution for each of the red, green and blue components. The YUV color space addresses some of the drawbacks RGB color space and utilizes luma (Y) and two color difference signals, namely, U and V. In this regard, U represents the difference between R and Y (R-Y) and V represents the difference between B and Y (B-Y). The U and V components are added so that a black and white television may properly represent a black and white image, which is normally represented by the luma (Y) component.

The display 106 may be, for example, a LCD panel that may be adapted to preview digital images that are captured by the camera 102. The display 106 may also be adapted to display image data that is previously stored in the storage block 108.

The storage block 108 may be any suitable memory such as a random access memory or flash memory for storing video.

The CODEC 110 may comprise suitable, logic and/or code that may be adapted to process video data and/or related audio data and store any resulting processed data in the storage block 108. The CODEC 110 is adapted to receive YUV formatted video for processing.

The RGB-YUV block 112 may comprise suitable logic, circuitry and/or code that may be adapted to convert RGB formatted video data received from the camera 102 to YUV formatted data, which may be directly processed by the CODEC 110.

In operation, the CPU 104 is adapted to receive RGB formatted video data at 15 frames per second (fps) and process it for display on the LCD panel 106 in the same RGB format. Since the CODEC 110 is adapted to receive YUV formatted video for processing, the RGB-YUV block 112 is used to convert the received native video format from RGB to YUV. Accordingly, the CPU 104 transfers received RGB formatted video to the LCD monitor 106 and, in conjunction with the RGB-YUV block 112, converts the RGB formatted video to YUV formatted video. The YUV formatted video is then communicated to the CODEC 110 for processing. The processed video output from the CODEC 110 may be stored in the storage block 108 for transmission or display.

The CPU 104 processes the received formatted video data on an image-by-image basis. In this regard, each image must be individually RGB and YUV processed by the CPU 104, which might include converting RGB formatted image data to YUV formatted image data by RGB-YUV 112. Individually processing each image for both RGB format and for YUV format is a computationally intensive task that requires a significant amount of CPU power and data transfer bandwidth. As a result, the whole system may easily become overloaded, resulting in reduced system performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for providing accelerated video processing in a communication device. Aspects of the method may comprise receiving video data from a video source on a chip, determining a first format for at least a portion of the received video data, and determining a second format of at least a remaining portion of the received video data. At least a portion of the received video data having the first format may be routed to a first device for processing and at least a remaining portion of the received video data having the second format may be routed to a second device for processing. The portion of the received video data with the first format may comprise RGB format, while the remaining portion of the received video data with the second format may comprise YUV format. The received video data comprises images with alternating video formats.

The portion of the received video data having the first format may be routed to a display device, while the remaining portion of the received video data having the second format may be routed to a compression/decompression (CODEC) device. At least a remaining portion of the received video data may be direct memory access (DMA) transferred to the compression/decompression (CODEC) device. Additionally, at least a remaining portion of the received video data may be direct memory access (DMA) transferred between the compression/decompression (CODEC) device and a memory. The received video data is transmitted from at least one video source that generates images having at least two alternating video formats.

Another embodiment of the invention provides a method for accelerating processing of video data, and comprises eliminating video format conversion on a chip from a first video format to a second video format by receiving from a source external to the chip, video data comprising images having alternating formats of the first video format and the second video format.

Another embodiment of the invention may provide a machine-readable storage, having stored thereon, a computer program having at least one code section executable by a machine, thereby causing the machine to perform the steps as described above for the methods for providing accelerated video processing in a communication device.

Aspects of the system for accelerating processing of video data may comprise at least one processor that receives video data from a video source on a chip. The at least one processor is adapted to determine a first format for at least a portion of the received video data and a second format of at least a remaining portion of the received video data. The at least one processor may also be adapted to route at least a portion of the received video data having the first format to a first device for processing and route at least a remaining portion of the received video data having the second format to a second device for processing. The at least a portion of the received video data with the first format comprises RGB format, while the at least a remaining portion of the received video data with the second format comprises YUV format. The received video data comprises images with alternating video formats. The received video data is transmitted from at least one video source that generates images having at least two alternating video formats.

The processor may be adapted to route a portion of the received video data having the first format to a display device and route the remaining portion of the received video data having the second format to a compression/decompression (CODEC) device. A direct memory access (DMA) controller may be configured to direct memory access transfer the at least a remaining portion of the received video data to the compression/decompression (CODEC) device. The direct memory access (DMA) controller may be configured to direct memory access transfer the at least a remaining portion of the received video data between the compression/decompression (CODEC) device and a memory.

Another embodiment of the invention provides a system for accelerating processing of video data, which comprises at least one processor that eliminates video format conversion on a chip from a first video format to a second video format by receiving from a source external to the chip, video data comprising images having alternating formats of the first video format and the second video format.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing accelerated video processing in a communication device. Providing accelerated video processing in a communication device may comprise receiving video data from a video source on a chip, determining a first format for at least a portion of the received video data, and determining a second format of at least a remaining portion of the received video data. At least a portion of the received video data having the first format may be routed to a first device for display and at least a remaining portion of the received video data having the second format may be routed to a second device for processing. The portion of the received video data with the first format typically comprise RGB format, while the remaining portion of the received video data with the second format comprises YUV format. The received video data comprises images with alternating video formats, which are accordingly routed to the first device for display or to the second device for processing.

Figure 1:
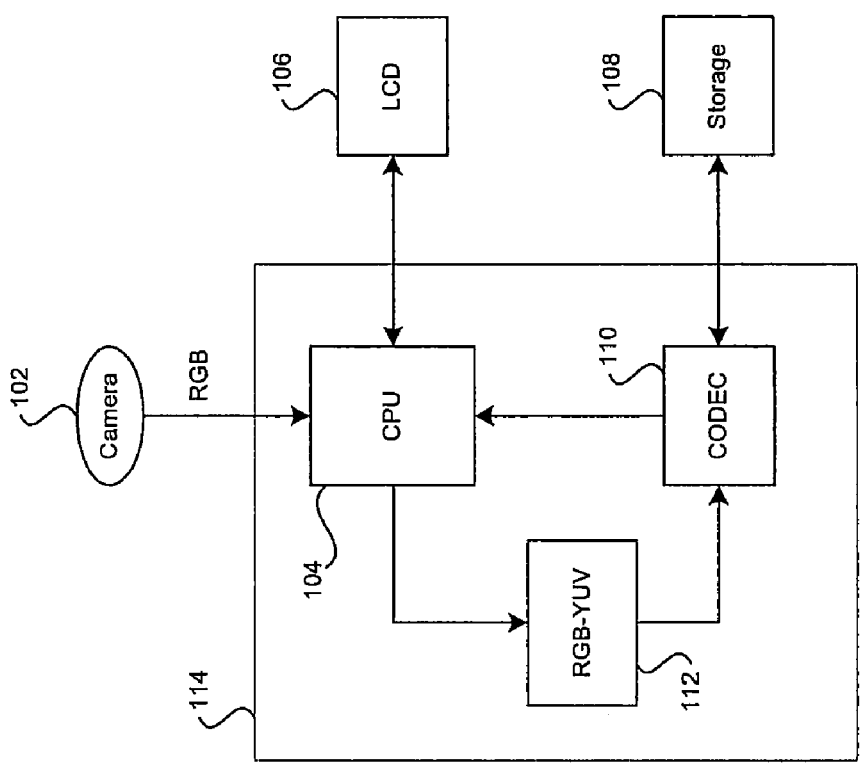
FIG. 1 is a block diagram of a conventional video processing subsystem of a communication device such as such as a mobile telephone, personal digital assistant (PDA) or a hybrid thereof.
Figure 2:
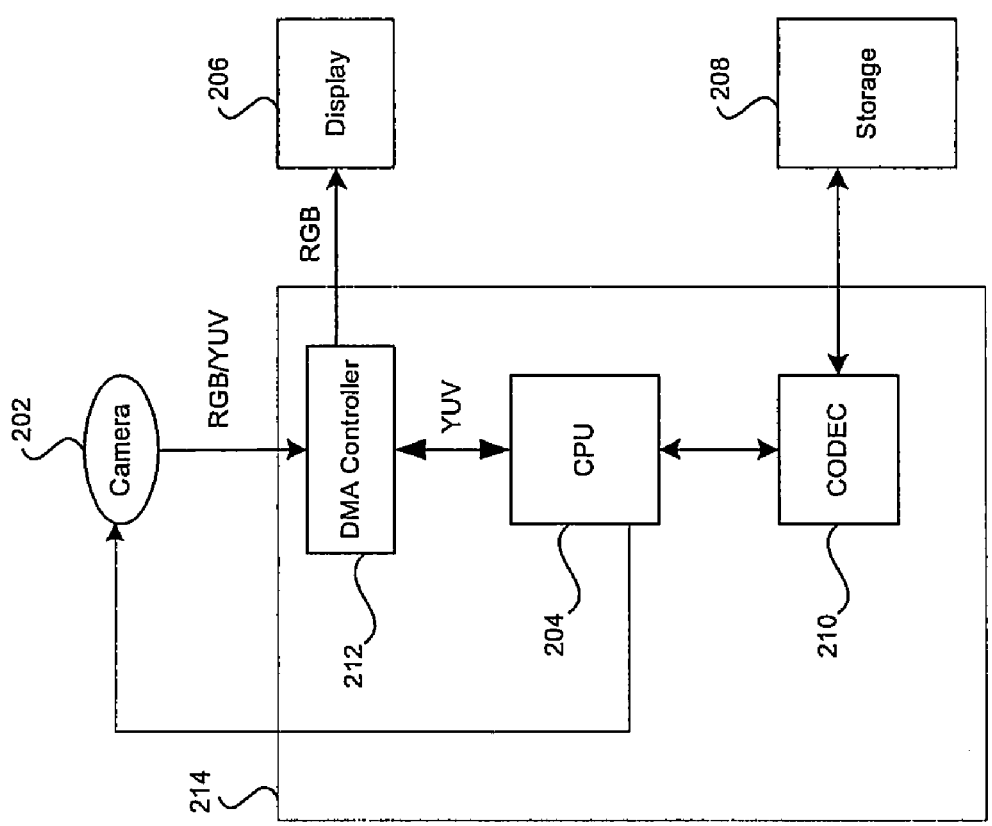
FIG. 2 is a block diagram of an exemplary video processing subsystem that may be utilized for providing accelerated video processing in a communication device, in accordance with an embodiment of the invention.

FIG. 2 is a block diagram of an exemplary video processing subsystem that may be utilized for providing accelerated video processing in a communication device, in accordance with an embodiment of the invention. Referring to FIG. 2, there is shown a camera 202, a CPU 204, display 206, storage block 208, CODEC 210, direct memory access (DMA) controller block 212. The CPU 204, CODEC 210 and DMA block 212, may be integrated within an integrated circuit (IC) 214 or system-on-chip (SoC), for example.

The camera 202 may have the capability to handle video and/or still images. The camera 202 may be adapted to generate video in a plurality of formats and at varying frame rates. In an embodiment of the invention, the camera 202 may be adapted to generate frames having alternate formats. For example, the camera 202 may be adapted to generate a first frame in RGB format, a second frame in YUV format, a third frame in RGB format, a fourth frame in YUV format, and so on. In this regard, the camera 202 may be configured so as to generate successive frames that have different formats. Hence, a first frame may have a first format, a second frame may have a second format, a third frame may have the first format, a fourth frame may have the second format, and so on.

The display 206 may be a monitor, for example, a liquid crystal display (LCD), plasma display or other type of display. The display 206 may be adapted to preview a sequence of digital images that are captured by the camera 202. The display 206 may also be adapted to display image data that is previously stored in the storage block 208.

The storage block 208 may be any suitable memory such as a random access memory (RAM) or flash memory that may be utilized for storing video data. For example, the storage block 208 may comprise a plurality of SRAM blocks.

The CODEC 210 may comprise suitable, logic and/or code that may be adapted to process video data and/or related audio data and communicate with the CPU 204 and/or DMA controller 212 in order to transfer and store any resulting processed data in the storage block 208. The CODEC 210 is adapted to accept YUV formatted video for processing.

The CODEC 210 compresses video data so that it may be stored in a significantly smaller space in the storage block 208. When the CPU 204 retrieves the compressed data from the storage block 208, the CODEC 210 decompresses the data to its original format.

The direct memory access controller block 212 may comprise suitable hardware and/or logic that may be adapted to facilitate direct transfer of video data to the Display 206 for display and the CODEC 210 for processing.

In operation, the camera 202 may be configured by CPU 204 to generate alternating formatted image data and the DMA controller 212 may be configured by CPU 204 to receive alternating formatted image data from the camera 202. In this regard, a first frame may be RGB formatted and a second frame may be YUV formatted. In an embodiment of the invention, the RGB formatted video data may have a frame rate of 15 frames per second (fps), while the YUV formatted video data may have a frame rate of 15 frames per second (fps). This results in an effective frame rate of 30 frames per second, which is produced by the camera 202. This does not pose any potential problems since most cameras such as camera 202 are capable of producing video at frame rates of at least 30 frames per second.

In accordance with an embodiment of the invention, the CPU 204 may be utilized to configure an alternating scheme for both the camera 202 and the DMA controller 212. The data for successive images may be transferred to the corresponding device based on whether it is RGB formatted or YUV formatted. In this regard, successive RGB images are sent to the display 206 and successive YUV formatted images are sent to the CODEC 210 for processing. Once the configuration is performed by CPU 204, both the camera 202 and the DMA controller 212 may continue to operate as configured without any further assistance from the CPU 204, therefore reducing the load on the CPU 204.

In accordance with various embodiments of the invention, increasing a rate at which frames are generated by the camera reduces the amount of processing which has to be done by the CPU 204. Furthermore, since the CPU 204 does not have to convert each image frame from RGB format to YUV format, this frees up a significant amount of processing resources, which may be utilized for other processing tasks. The reduced processing requirements may allow a smaller die to be utilized, thereby resulting in smaller chip real estate and reduced costs.

Figure 3:
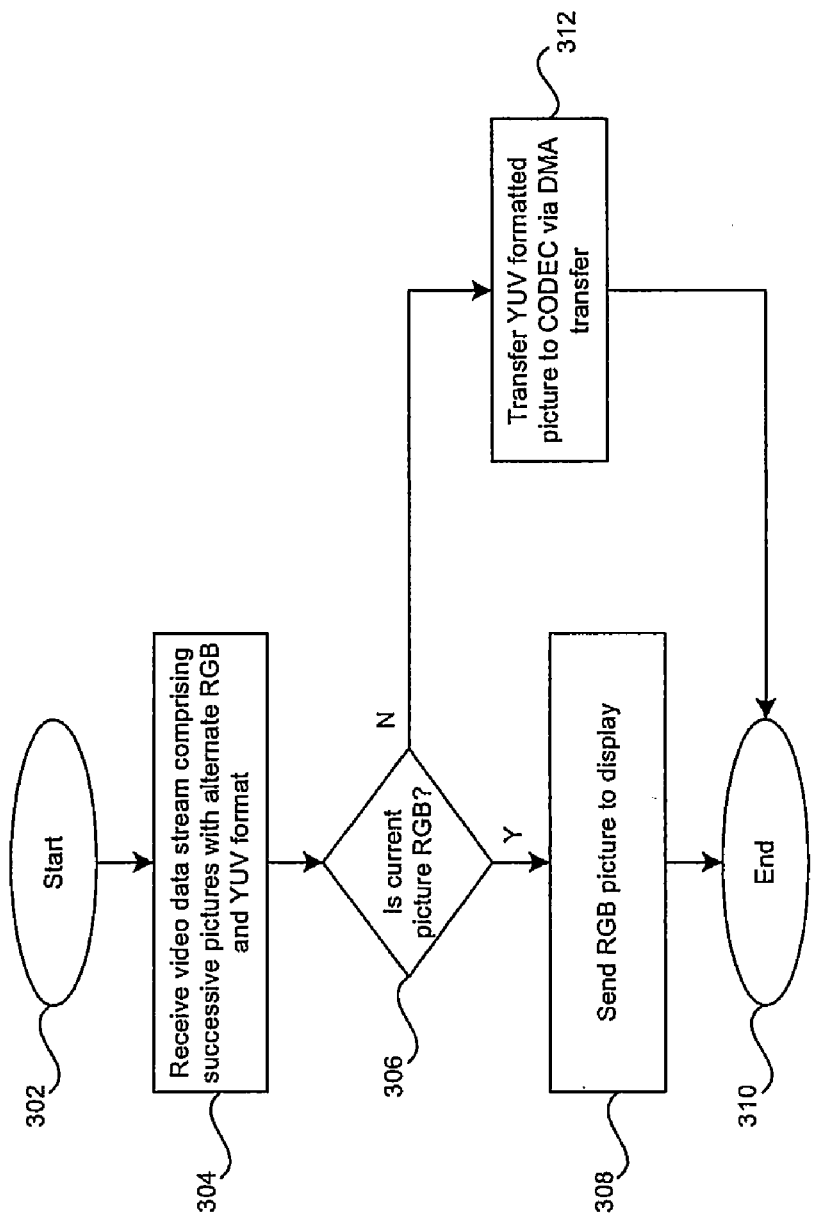
FIG. 3 is a flow chart illustrating exemplary steps that may be utilized for accelerating processing of video data on-chip, in accordance with an embodiment of the invention.

FIG. 3 is a flow chart illustrating exemplary steps that may be utilized for accelerating processing of video data on-chip, in accordance with an embodiment of the invention. The exemplary steps start at step 302. In step 304, video data stream comprising successive images with alternate RGB and YUV format. In step 306, it is determined whether a current image is in RGB format. If it is determined that the current image is RGB formatted, then in step 308, the RGB formatted image may be sent to a display. If the current image is not in RGB format, then it is YUV and may be transferred to a CODEC via, for example, a DMA transfer. Subsequent to steps 308, and 312, the exemplary steps may end at step 310.

In another aspect of the invention, the format of an image may be determined based on a known format of a first image, for example. For example, a counter may be utilized to count and keep track of the images. Hence, if the first image is a RGB formatted image, then all subsequent odd images may be classified as RGB formatted. In this regard, all even images will be classified as YUV formatted images.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:

receiving on a chip, input video data comprising a plurality of formats;

separating, within said chip, said input video data to generate a first portion of output video data corresponding to one of said plurality of formats for rendering on a first display device, and at least another portion of output video data corresponding to at least another of said plurality of formats; and outputting from said chip, said at least another portion of output video data corresponding to said at least another of said plurality of formats for processing by a second device.

2. The method according to claim 1, comprising routing said first portion of said output video data corresponding to said one of said plurality of formats to said first display device.

3. The method according to claim 1, comprising routing said at least another portion of said output video data corresponding to said at least another of said plurality of formats to a compression/decompression (CODEC) device.

4. The method according to claim 3, comprising direct memory access (DMA) transferring said at least another portion of said output video data corresponding to said at least another of said plurality of formats to said compression/decompression (CODEC) device.

5. The method according to claim 1, wherein said first portion of said output video data corresponding to said one of said plurality of formats comprises RGB format.

6. The method according to claim 1, wherein said at least another portion of said output video data corresponding to said at least another of said plurality of formats comprises YUV format.

7. The method according to claim 1, wherein said input video data comprises images with alternating video formats.

8. The method according to claim 1, wherein said input video data is transmitted from at least one video source that generates successive images having at least two alternating video formats.

9. A machine-readable storage having stored thereon, a computer program having at least one code section for processing video data, the at least one code section being executable by a machine for causing the machine to perform steps comprising:

receiving on a chip, input video data comprising a plurality of formats;

separating, within said chip, said input video data to generate a first portion of output video data corresponding to one of said plurality of formats for rendering on a first display device, and at least another portion of output video data corresponding to at least another of said plurality of formats; and outputting from said chip, said at least another portion of output video data corresponding to said at least another of said plurality of formats for processing by a second device.

10. The machine-readable storage according to claim 9, comprising code for routing said first portion of said output video data corresponding to said one of said plurality of formats to said first display device.

11. The machine-readable storage according to claim 9, comprising code for routing said at least another portion of said output video data corresponding to said at least another of said plurality of formats to a compression/decompression (CODEC) device.

12. The machine-readable storage according to claim 11 comprising code for direct memory access (DMA) transferring said at least another portion of said output video data corresponding to said at least another of said plurality of formats to said compression/decompression (CODEC) device.

13. The machine-readable storage according to claim 9, wherein said first portion of said output video data corresponding to said one of said plurality of formats comprises RGB format.

14. The machine-readable storage according to claim 9, wherein said at least another portion of said output video data corresponding to said at least another of said plurality of formats comprises YUV format.

15. The machine-readable storage according to claim 9, wherein said input video data comprises images with alternating video formats.

16. The machine-readable storage according to claim 9, wherein said input video data is transmitted from at least one video source that generates successive images having at least two alternating video formats.

17. A system for processing video data, the system comprising:

at least one processor that receives on a chip, input video data comprising a plurality of formats;

said at least one processor separates, within said chip, said input video, to generate a first portion of output video data corresponding to one of said plurality of formats for rendering on a first display device, and at least another portion of output video data corresponding to at least another of said plurality of formats; and said at least one processor outputs from said chip, said at least another portion of output video data corresponding to said at least another of said plurality of formats for processing by a second device.

18. The system according to claim 17, wherein said at least one processor routes said first portion of said output video data corresponding to said one of said plurality of formats to said first display device.

19. The system according to claim 17, wherein said at least one processor routes said at least another portion of said output video data corresponding to said at least another of said plurality of formats to a compression/decompression (CODEC) device.

20. The system according to claim 19, wherein said at least one processor direct memory access (DMA) transfers said at least another portion of said output video data corresponding to said at least another of said plurality of formats to said compression/decompression (CODEC) device.

21. The system according to claim 17, wherein said first portion of said output video data corresponding to said one of said plurality of formats comprises RGB format.

22. The system according to claim 17, wherein said at least another portion of said output video data corresponding to said at least another of said plurality of formats comprises YUV format.

23. The system according to claim 17, wherein said input video data comprises images with alternating video formats.

24. The system according to claim 17, wherein said input video data is transmitted from at least one video source that generates successive images having at least two alternating video formats.

\* \* \* \* \*